(12) United States Patent
Moloney

(10) Patent No.: US 8,730,190 B2
(45) Date of Patent: May 20, 2014

(54) DETECT MOTION GENERATED FROM GESTURES USED TO EXECUTE FUNCTIONALITY ASSOCIATED WITH A COMPUTER SYSTEM

(75) Inventor: David Moloney, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 658 days.

(21) Appl. No.: 13/006,320

(22) Filed: Jan. 13, 2011

(65) Prior Publication Data

US 2012/0182222 A1 Jul. 19, 2012

(51) Int. Cl.
*G06F 3/041* (2006.01)
(52) U.S. Cl.
USPC .......................................... 345/173; 345/178
(58) Field of Classification Search
CPC ....... G06F 3/011; G06F 3/017; G06F 3/0487; H03D 9/00
USPC ......... 345/156–179; 178/1–18; 715/705, 863; 382/118
See application file for complete search history.

(56) References Cited

U.S. PATENT DOCUMENTS

| | | | | |
|---|---|---|---|---|
| 8,319,746 B1* | 11/2012 | Ho et al. | | 345/173 |
| 8,432,368 B2* | 4/2013 | Momeyer et al. | | 345/173 |
| 8,493,330 B2* | 7/2013 | Krah | | 345/173 |
| 2004/0223089 A1* | 11/2004 | Hong et al. | | 349/12 |
| 2007/0211031 A1* | 9/2007 | Marc | | 345/163 |
| 2007/0236450 A1* | 10/2007 | Colgate et al. | | 345/156 |
| 2007/0273658 A1* | 11/2007 | Yli-Nokari et al. | | 345/173 |
| 2008/0005703 A1* | 1/2008 | Radivojevic et al. | | 715/863 |
| 2008/0258679 A1* | 10/2008 | Manico et al. | | 320/106 |
| 2009/0256817 A1* | 10/2009 | Perlin et al. | | 345/174 |
| 2011/0043463 A1* | 2/2011 | Kooh et al. | | 345/173 |
| 2011/0205151 A1* | 8/2011 | Newton et al. | | 345/156 |
| 2011/0205155 A1* | 8/2011 | Newton et al. | | 345/157 |
| 2011/0205186 A1* | 8/2011 | Newton et al. | | 345/175 |
| 2011/0291918 A1* | 12/2011 | Surber et al. | | 345/8 |
| 2012/0056804 A1* | 3/2012 | Radivojevic et al. | | 345/156 |
| 2012/0176343 A1* | 7/2012 | Holmgren et al. | | 345/175 |
| 2012/0194479 A1* | 8/2012 | Stark et al. | | 345/175 |
| 2012/0223882 A1* | 9/2012 | Galor et al. | | 345/157 |
| 2013/0044073 A1* | 2/2013 | Christiansson et al. | | 345/173 |

* cited by examiner

*Primary Examiner* — Prabodh M Dharia
(74) *Attorney, Agent, or Firm* — Mahamedi Paradice Kreisman LLP

(57) ABSTRACT

A system and method to detect motion generated from gestures, the gestures used to execute functionality associated with a computer system is described. The system includes a touch-sensitive display for receiving input. Further, the system includes a processor to convert the user input into an electrical signal to activate a sensor, the sensor to generate field of view. Additionally, the system includes a sensor logic module to identify at least one wave value associated with a gesture object residing within the field of view. Moreover, the system includes a receiver wave logic module to determine that the at least one wave value has exceeded a limit value. The system also includes a gesture logic module to execute functionality associated with the at least one wave value, the functionality related to an application depicted on the touch-sensitive display.

16 Claims, 11 Drawing Sheets

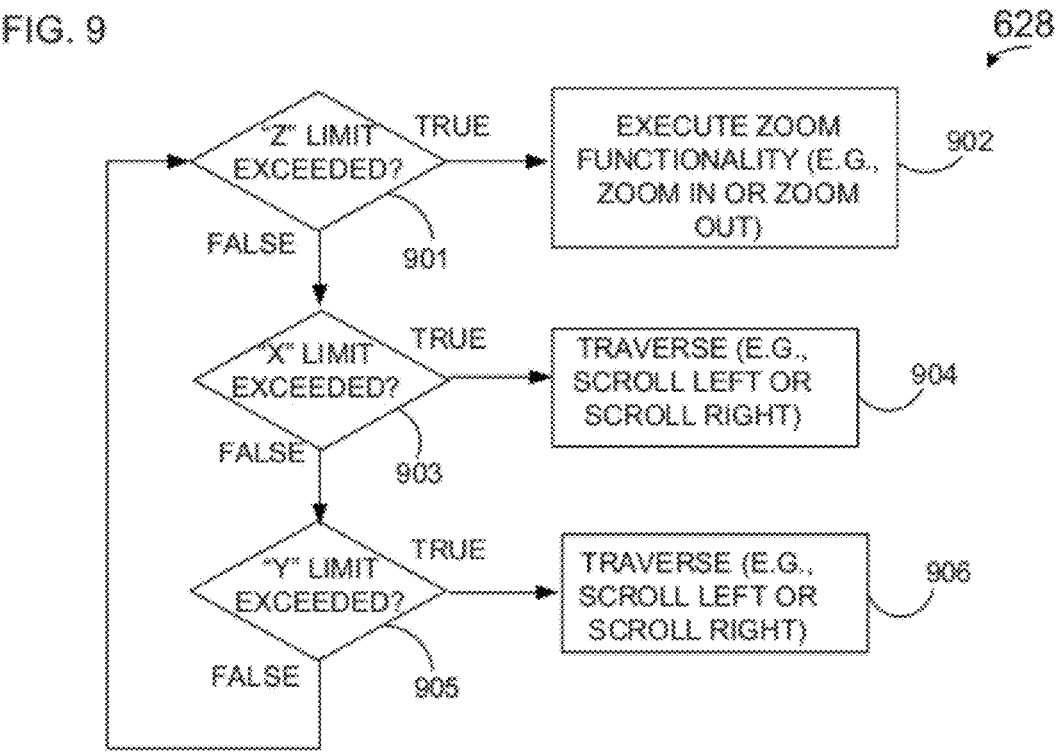
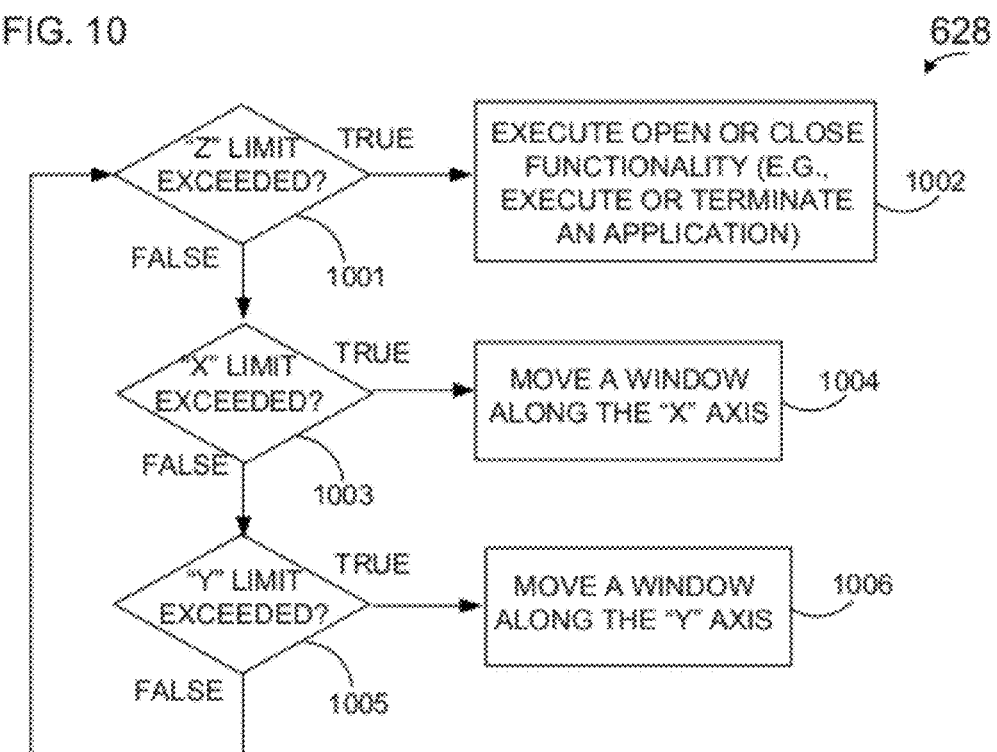

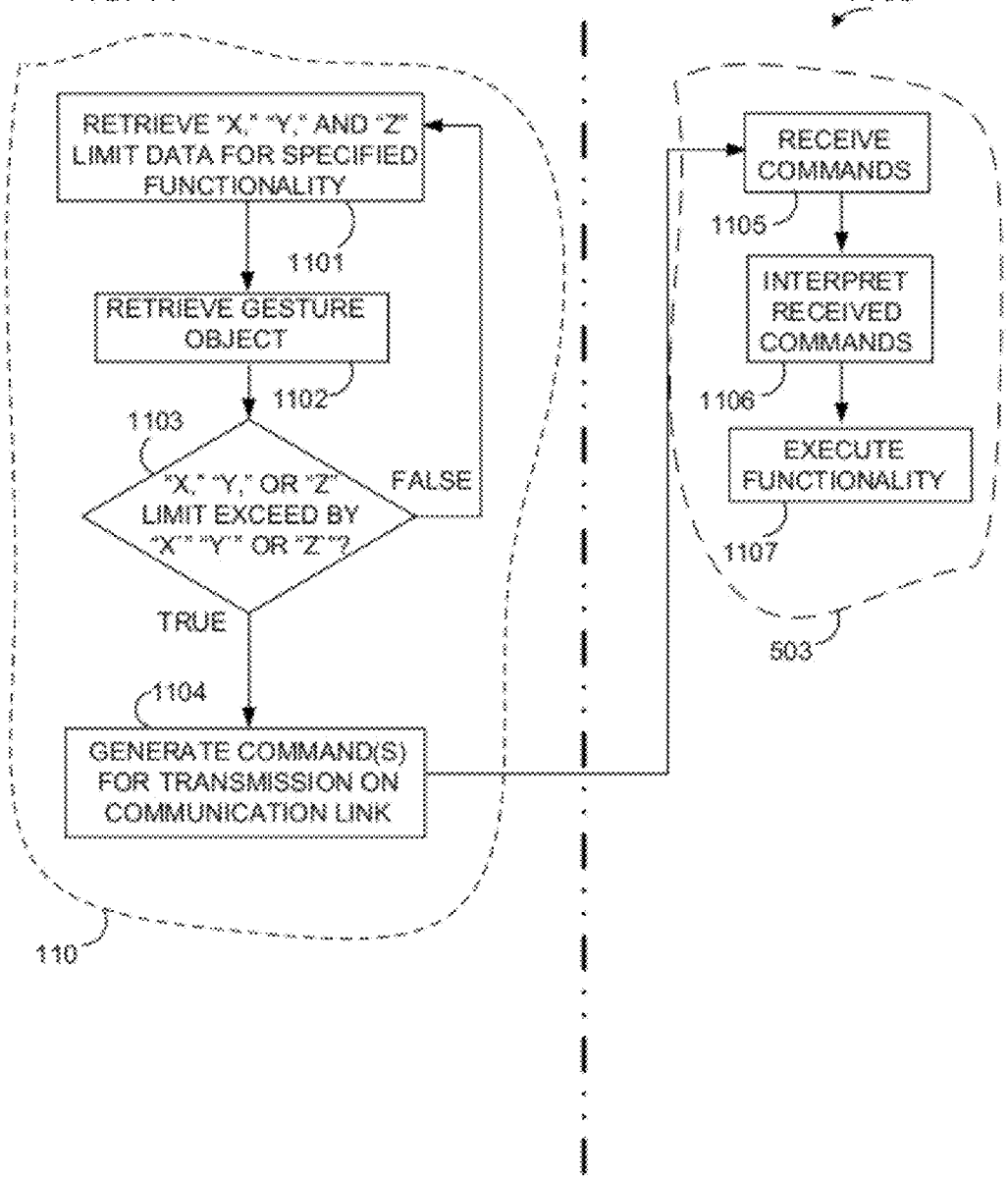

DETECT MOTION GENERATED FROM GESTURES USED TO EXECUTE FUNCTIONALITY ASSOCIATED WITH A COMPUTER SYSTEM

BACKGROUND

Remote sensing can be performed using a variety of technologies including sound (acoustic sensors), opacity (optical and infrared sensors and video image processors), geomagnetism (magnetic sensors, magnetometers), reflection of transmitted energy (infrared laser radar, ultrasonic sensors, and microwave radar sensors), electromagnetic induction (inductive-loop detectors), or vibration (triboelectric, seismic, and inertia-switch sensors). This sensing can be used to record the position objects in real-time. Further, this sensing can be done wirelessly.

BRIEF DESCRIPTION OF THE DRAWINGS

Some embodiments of the invention are described, by way of example, with respect to the following figures:

FIG. 9 is a flow chart illustrating a method, according to one example embodiment, associated with executing a gesture logic module to facilitate zoom and traversal functionality.

FIG. 10 is a flow chart illustrating a method, according to one example embodiment, associated with executing a gesture logic module to facilitate open/close and axis traversal functionality.

FIG. 11 is a dual-stream flow chart illustrating a method, according to one example embodiment, to remotely control a peripheral device, the control of the peripheral device facilitated through the use of gestures and ultrasonic waves.

DETAILED DESCRIPTION

Figure 1:
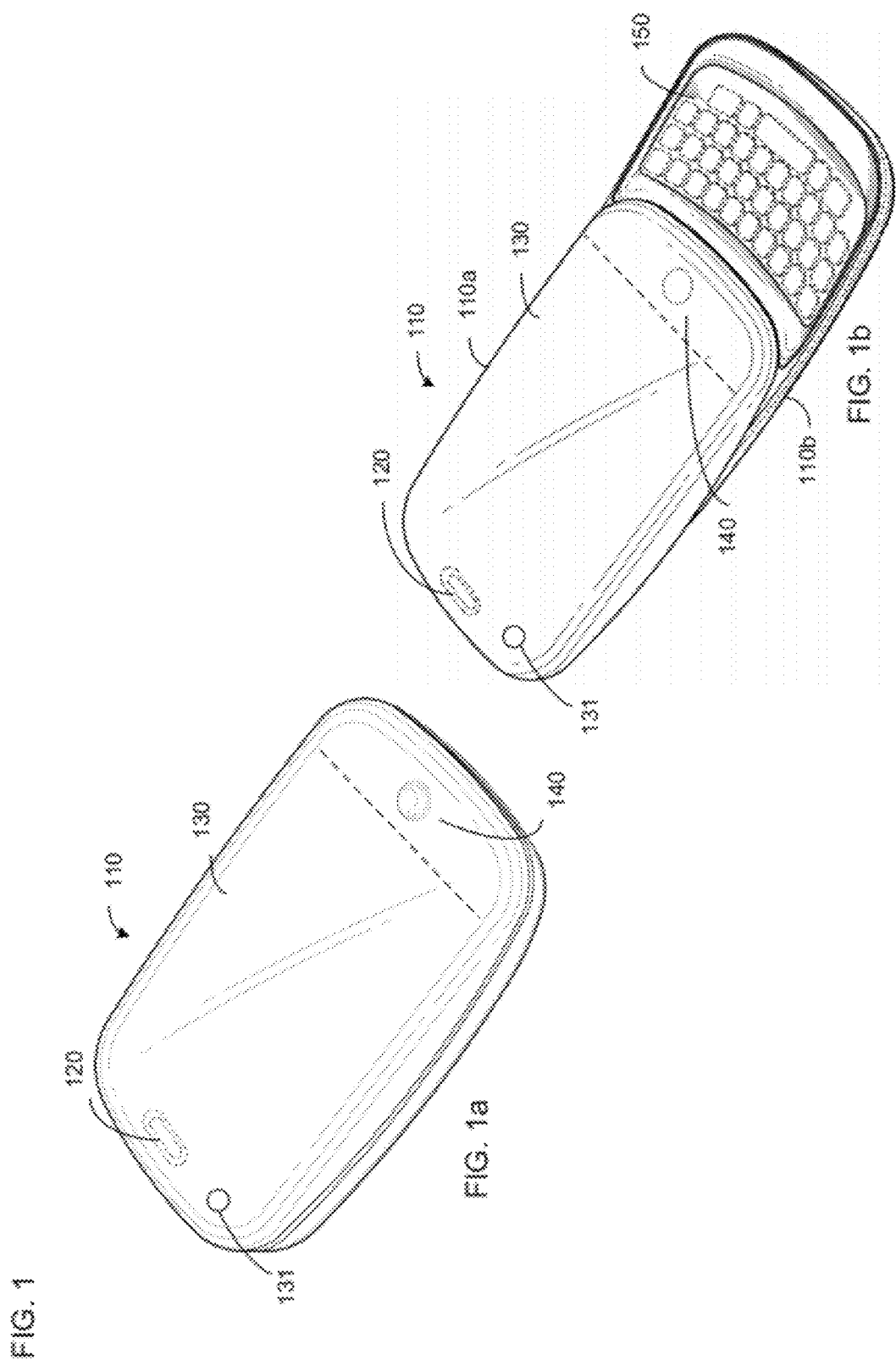
FIG. 1a illustrates one example embodiment of a mobile computing device in a first positional state.
FIG. 1b illustrates one example embodiment of the mobile computing device in a second positional state that includes a sensor to detect gestures.

Illustrated is a system and method to detect motion generated from hand gestures, the hand gestures used to execute functionality associated with a computer system. As used herein, the detection of motion may be facilitated by: sound (acoustic sensors), opacity (optical and infrared sensors and video image processors), geomagnetism (magnetic sensors, magnetometers), reflection of transmitted energy (infrared laser radar, ultrasonic sensors, and microwave radar sensors), electromagnetic induction (inductive-loop detectors), or vibration (triboelectric, seismic, and inertia-switch sensors). The functionality associated with a computer system may include actions respecting a Graphical User Interface (GUI) and the manipulation of windows associated therewith (referenced herein as GUI functionality). A window, as used herein, is a two-dimensional frame that includes icons relating to functionality associated with a computer system.

In one example embodiment, ultrasonic energy is used to generate a three-dimensional field of view. Gestures are performed using within this three-dimensional field of view so as to execute GUI functionality. A hand gesture is an example of a gesture. For example, if a user desires to zoom in on an icon displayed in a window, a user may bring their hand closer to sensor generating and receiving the ultrasonic energy. Zoom in, as used herein, including displaying with a higher resolution. This zoom in may occur along a "Z" axis of the three-dimensional field. In contrast, if a user desires to zoom out of a particular icon in the window, the user may remove their hand from proximity to the sensor generating and receiving the ultrasonic energy. Zoom out, as used herein, including displaying with a lower resolution. This zoom out may occur along a "Z" axis of the three-dimensional field. If a user desires to traverse the window using hand gestures, the user may move their hand within the three-dimensional field left to right, or top to bottom, along an "X" or "Y" axis. This zoom in or zoom out may be used to decrease or increase sound emanating from a computer system reading or otherwise executing a file (e.g., an MPEG, WAV, ACC, or other suitable media file). Further, the user may use a combination of hand gestures along the "X," "Y," and "Z" axis of the three-dimensional field to both zoom out, zoom in, or traverse a window. The position of a hand gesture along a "Z" axis may be determined based upon the elapsed time between the transmission of an ultrasonic wave and its detection as a reflected wave. Further, the position of the hand gesture in the "X" or "Y" axis may be determined based upon the intensity (i.e., a vector) of the reflected wave.

In some example embodiments, limits are set within the three-dimensional field that, when exceeded, facilitate the execution of additional functionality. For example, where a particular value in the three-dimensional field on the "X" or "Y" axis is exceeded a new window is opened, or otherwise brought into focus. Focus, as used herein, denotes the component (e.g., icon) of a GUI which is currently selected to receive input. Additionally, where a particular value in the three-dimensional field on the "Z" axis is exceeded an application represented by an icon may be executed or termination (i.e., closed). The combination of gestures used within this three-dimensional field may be executed in lieu of, or in combination with, gestures detected using a touch activated display (i.e., a touch screen).

FIGS. 1a and 1b illustrate one embodiment of a mobile computing device 110 that is used to detect motion generated from hand gestures, the hand gestures used to execute functionality associated with the mobile computing device 110. FIG. 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, slate device, smartphone, netbook, or laptop computer. The mobile computing device 110 is configured to host and execute a phone application for placing and receiving telephone calls. In one example embodiment, the configuration as disclosed may be configured for use between a mobile computing device, that may be host device, and an accessory device.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with Public Switched Telephone Networks (PSTN) and/or data networks having Voice over Internet Protocol (VoIP) functionality. Likewise, the mobile computing device 110 is only by way of example, and the principles of its functionality apply to other computing devices, e.g., desktop computers, slate devices, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a Personal Digital Assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The mobile computing device 110 also includes a sensor 131, the mobile computing device having an opening(s) on its exterior to allow the sensor 131 to receive data. This data may be sound waves, heat, light, electromagnetic waves, or some other suitable form of energy. In some example embodiments, a protective cover may be positioned over the sensor 131 to protect the sensor 131 from dust, particles, extraneous energy, or other things that interfere with the functioning of the sensor. In some example embodiments, the protective cover acts to focus the energy detected by the sensor, and to exclude other types of energy that is not detected or whose detection results in a false positive. Multiple Fresnel lenses may be molded into this protective cover. The sensor 131, and associated opening and cover, may be positioned anywhere on the mobile computing device 110. The positioning of sensor 131 in FIGS. 1a and 1b is merely for illustrative purposes. In some example embodiments, a plurality of sensors 131 may be positioned on the mobile computing device 110 along with a plurality of openings each corresponding to at least one sensor 110. As illustrated above, this sensor 110 may be an acoustic sensors, optical and infrared sensors and video image processors, magnetic sensor, infrared laser radar, ultrasonic sensor, and microwave radar sensor, inductive-loop detector, or triboelectric, seismic, and inertia-switch sensors.

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. In one embodiment the screen may be 1.5 inches to 5.5 inches (or 4 centimeters to 14 centimeters) diagonally. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an Active-matrix OLED (AMOLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACT FLASH, SD CARD, XD CARD, MEMORY STICK, MULTIMEDIA CARD, SDIO, and the like.

Figure 2:
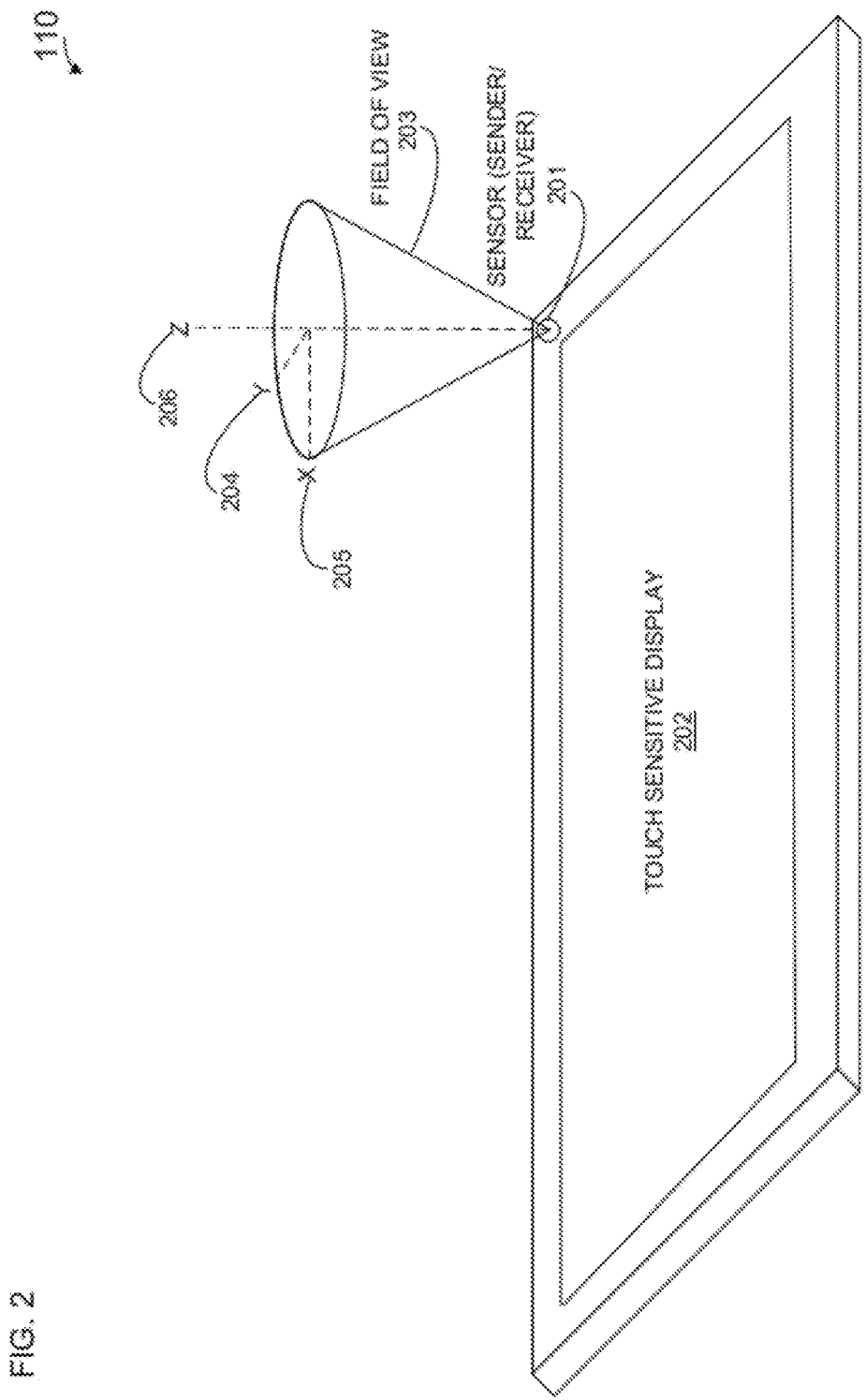
FIG. 2 is a diagram of a mobile computing device, according to one example embodiment, in the form of a slate enabled to detect motion generated from gestures, the gestures used to execute functionality associated with the mobile computing device.

FIG. 2 is a diagram of a mobile computing device 110 in the form of a slate enabled to detect motion generated from gestures, the gestures used to execute functionality associated with the mobile computing device 110. Shown is a mobile computing device 110 that includes a sensor 201 and a touch sensitive display 202. The sensor 201 may be used to send and receive energy in the form of sound waves, opacity, geomagnetism, reflection of transmitted energy, electromagnetic induction, or vibrational waves. For the purpose on illustration only, this sensor 201 may be an ultrasonic transmitter/receiver. Using the sensor 201, a field of view 203 is generated. This field of view 203 is conical in nature having "X," "Y," and "Z" axes. These axes are denoted at 205, 204 and 206 respectively. As is discussed in more detail below, in one example embodiment, ultrasonic waves are generated by the sensor 201 to create a three-dimensional field in the form of the field of view 203. These waves may have a frequency of greater than 20 kHz. In some example embodiments, a visible light source may be provided so as to color the field of view 203 so as to make the field of view 203 visible to the human eye. This color may be red, yellow, blue, or some other suitable color. This visible light source may be emitted from the sensor 201 along with the sent energy.

Figure 3:
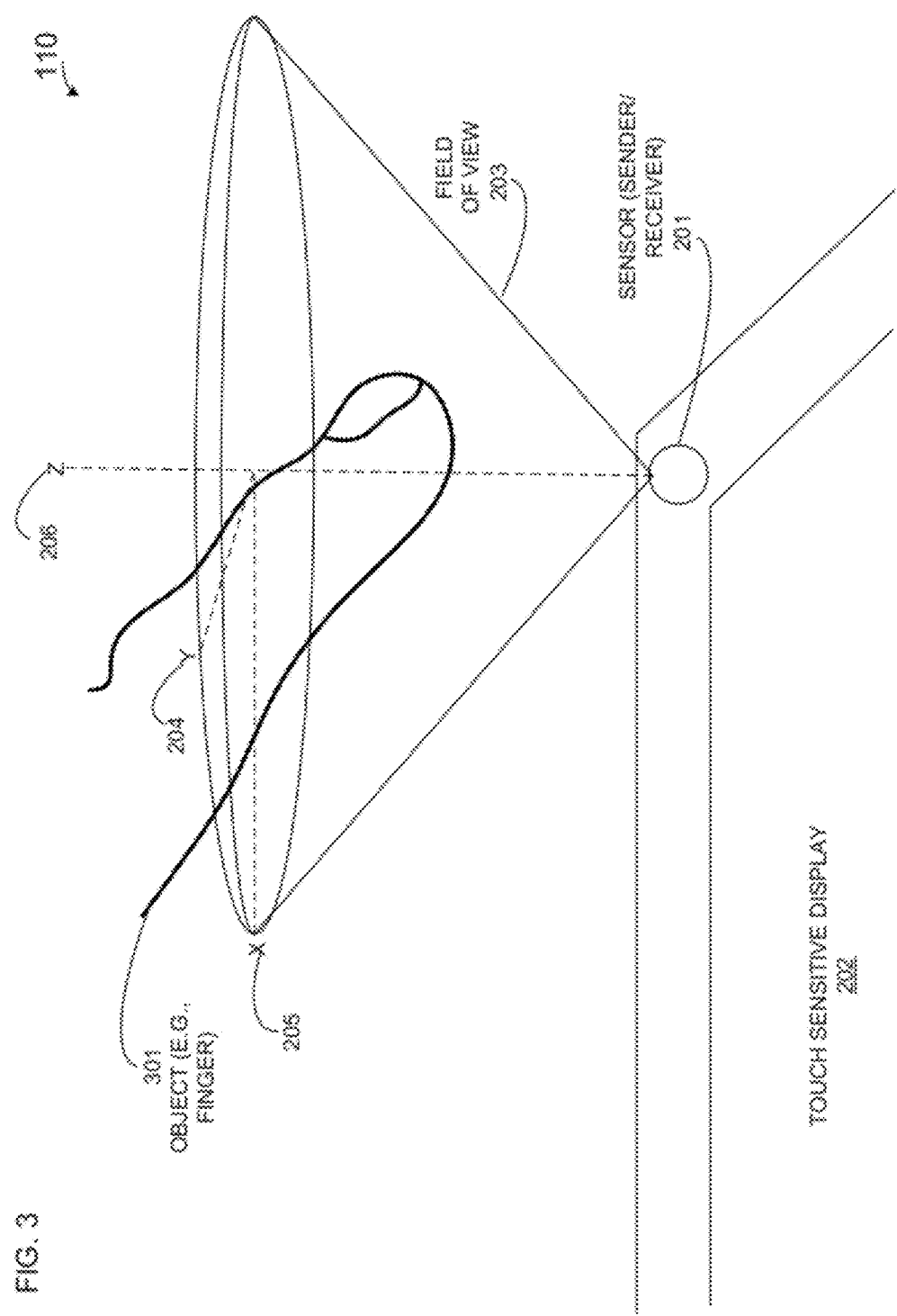
FIG. 3 is a diagram of a mobile computing device, according to one example embodiment, in the form of a slate enabled to detect motion generated from gestures, the gestures in the form of a pointed finger used to execute functionality associated with the mobile computing device.

FIG. 3 is a diagram of a mobile computing device 110 in the form of a slate enabled to detect motion generated from gestures, the gestures in the form of a pointed finger used to execute functionality associated with the mobile computing device 110. Shown is an object 301 in the form of a finger that is placed into the field of view 203. As is discussed in more detail below, this object 301 reflects the energy waves in the form of ultrasonic waves along "X," "Y," and "Z" axes so as to generate indicia of input facilitating the execution of functionality associated with the mobile computing device 110. This functionality may be the aforementioned zoom in, zoom out, or transversal functionality. Further, this input may be used to execute an application or terminate a currently executing application.

Figure 4:
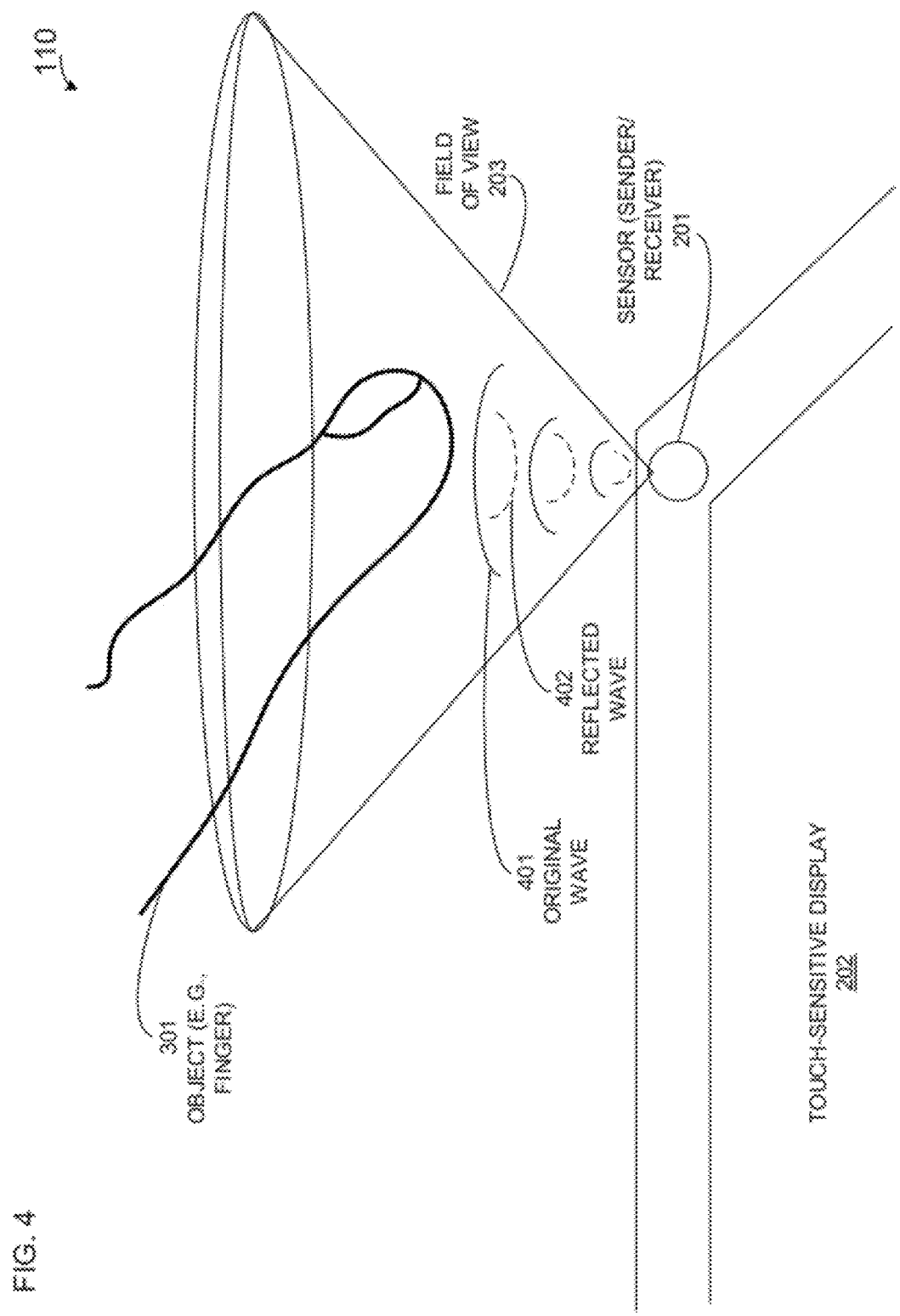
FIG. 4 is a diagram of a mobile computing device, according to one example embodiment, in the form of a slate enabled to detect motion generated from gestures, the detection facilitated through the use of ultrasonic waves.

FIG. 4 is a diagram of a mobile computing device 110 in the form of a slate enabled to detect motion generated from gestures, the detection facilitated through the use of ultrasonic waves. Shown is the field of view 203 that is created from a plurality of original waves 401. These original waves 401 may be ultrasonic waves. These original waves 401 are generated by the sensor 201. When these original waves 401 encounter the object 301, they are reflected as a plurality of reflected waves 402. The reflected waves 402 are detected by the sensor 201. Using the method outlined below, the position of the object 301 within the field of view 203 can be determined. This position determined along "X," "Y," and "Z" axes, and in a three-dimensional space.

Figure 5:
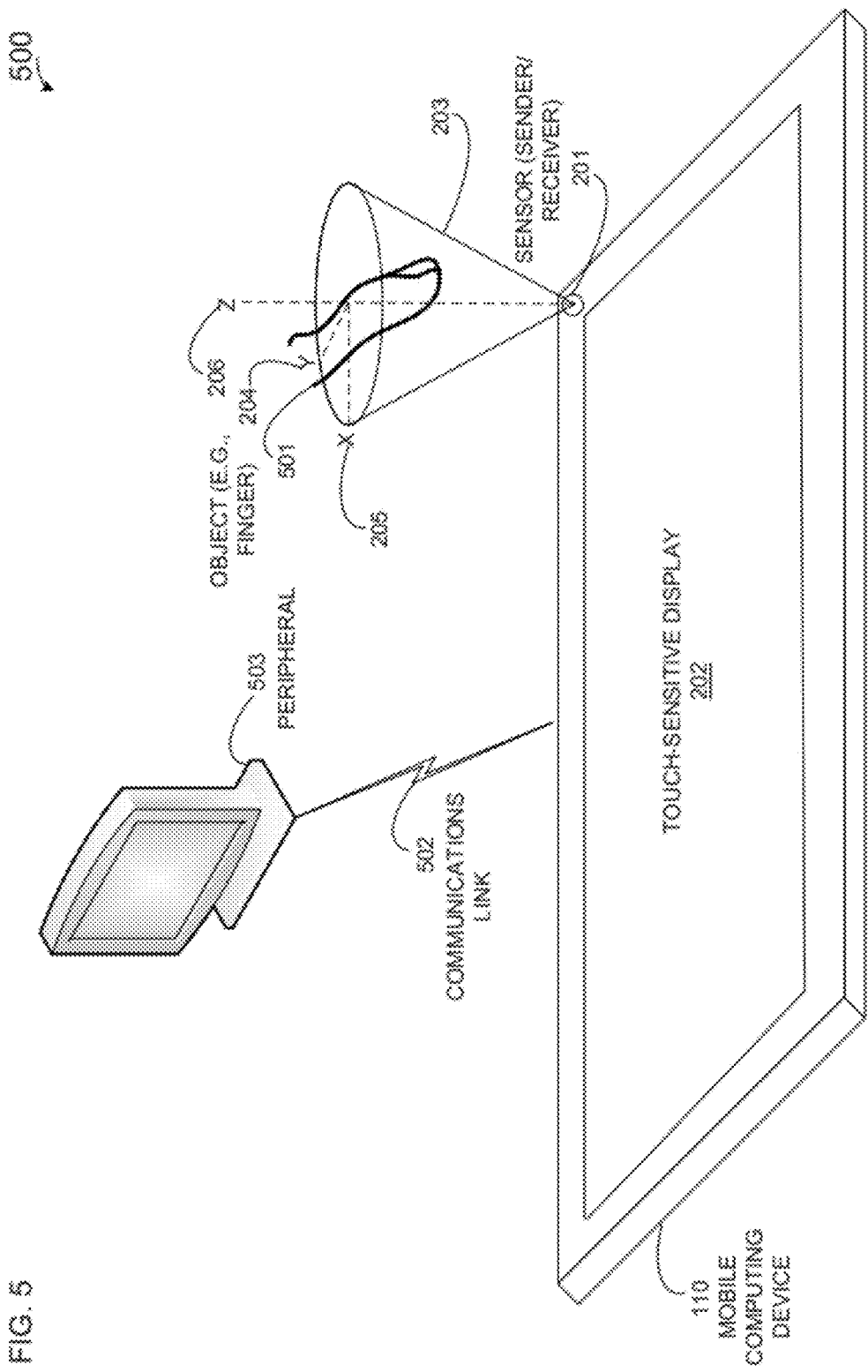
FIG. 5 is a diagram of a system, according to one example embodiment, used to remotely control a peripheral device, the control of the peripheral device facilitated through the use of gestures and ultrasonic waves.

FIG. 5 is a diagram of a system 500 used to remotely control a peripheral device, the control of the peripheral device facilitated through the use of gestures and ultrasonic waves. As used herein, a peripheral device is a device that expands the host's capabilities, but does not form part of the core computer architecture of the host device. Examples of peripheral devices include computer printers, image scanners, tape drives, microphones, video cameras, loudspeakers, webcams, monitors, televisions, and digital cameras. The mobile computing device 110 is an example of a host. Shown is an object 501 that is used to create gestures within the field of view 203. As will be discussed in more detail below, these gestures are analyzed and commands are sent by the mobile computing device 110 along a communication link 502 to a peripheral 503. The commands are interpreted by the peripheral 503 and functionality executed by the peripheral 503.

The communications link 502 may be a logical or physical connection use to send and receive commands. The communications link 502 may be a Universal Serial Bus (USB) based connection that uses a physical wire to connect the mobile computing device 110 and the peripheral 503. In the alternative, the communication link 502 may use any one of a number of wireless encoding methods and protocol standards. These encoding methods include the over-the-air modulation of energy, the energy being in the Infra Red (IR) spectrum, ultrasonic spectrum or some other suitable spectrum. The standards used with this encoded data includes a Global System for Mobile Communications (GSM), General packet radio Service (GPRS), Enhanced Data rates for GSM Evolution (EDGE), Personal Communications Service (PCS), Code Divisional Multiple Access (CDMA), Evolution-Data Optimized (EV-DO), High-Speed Downlink Packet Access (HSDPA), High-Speed Uplink Packet Access (HSUPA), Advanced Wireless Services (AWS), Long Term Evolution (LTE), Worldwide Interoperability for Microwave Access (WiMax), Institute of Electrical and Electronics Engineers (IEEE) 802.11, IEEE 802.16, IEEE 802.15, or IEEE 802.20.

Figure 6:
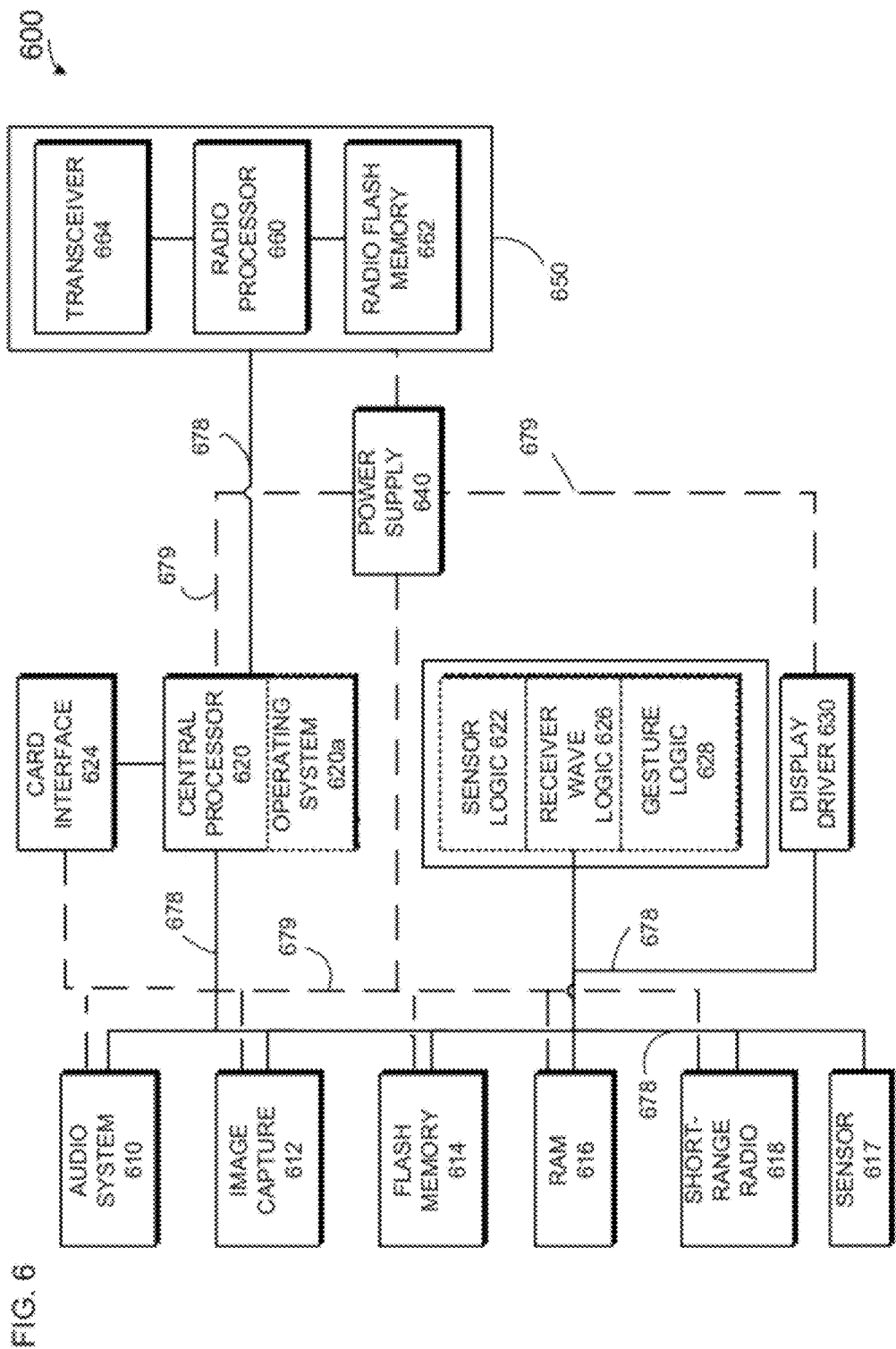
FIG. 6 is a block diagram illustrating an architecture of a mobile computing device, according to one example embodiment, enabled to detect motion generated from gestures.

Referring next to FIG. 6, a block diagram illustrates an example architecture of a mobile computing device 110, enabled to detect motion generated from gestures. By way of example, the architecture illustrated in FIG. 6 will be described with respect to the mobile computing device of FIG. 1a, 1b, 3, 4, or 5. The mobile computing device 110 includes a central processor 620, a power supply 640, and a radio subsystem 650. Examples of a central processor 620 include processing chips and system based on architectures such as ARM (including cores made by microprocessor manufacturers), ARM XSCALE, QUALCOMM SNAPDRAGON, AMD ATHLON, SEMPRON or PHENOM, INTEL ATOM, XSCALE, CELERON, CORE, PENTIUM or ITANIUM, IBM CELL, POWER ARCHITECTURE, SUN SPARC and the like.

The central processor 620 is configured for operation with a computer operating system 620a. The operating system 620a is an interface between hardware and an application, with which a user typically interfaces. The operating system 620a is responsible for the management and coordination of activities and the sharing of resources of the mobile computing device 110. The operating system 620a provides a host environment for applications that are run on the mobile computing device 110. As a host, one of the purposes of an operating system is to handle the details of the operation of the mobile computing device 110. Examples of an operating system include PALM OS and WEBOS, MICROSOFT WINDOWS (including WINDOWS 7, WINDOWS CE, and WINDOWS MOBILE), SYMBIAN OS, RIM BLACKBERRY OS, APPLE OS (including MAC OS and IPHONE OS), GOOGLE ANDROID, QNX, MEEGO, and LINUX.

The central processor 620 communicates with an audio system 610, an image capture subsystem (e.g., camera, video or scanner) 612, flash memory 614, RAM memory 616, a sensor 617, and a short range radio module 618 (e.g., Bluetooth, Wireless Fidelity (WiFi) component (e.g., IEEE 802.11, 802.20, 802.15, 802.16)). The sensor 617 is an example of the previously illustrated sensor 201. The central processor 620 communicatively couples these various components or modules through a data line (or bus) 678. The power supply 640 powers the central processor 620, the radio subsystem 650 and a display driver 630 (which may be contact- or inductive-sensitive). The power supply 640 may correspond to a direct current source (e.g., a battery pack, including rechargeable) or an alternating current (AC) source. The power supply 640 powers the various components through a power line (or bus) 679. The central processor communicates with applications executing within the mobile computing device 110 through the operating system 620a.

It is noted that in one embodiment, central processor 620 executes logic (e.g., by way of programming, code, or instructions) corresponding to executing applications interfaced through, for example, the navigation area 140 or switches. It is noted that numerous other components and variations are possible to the hardware architecture of the computing device 600, thus an embodiment such as shown by FIG. 6 is just illustrative of one implementation for an embodiment.

In one embodiment, the sensor logic module 622 is shown that comprises software (e.g., integrated with the operating system) or firmware (lower level code that resides is a specific memory for that code and for interfacing with specific hardware, e.g., the processor 620). The sensor logic module 622 is configured to execute a sensor 131 or 201 used to generate a field of view 203, and is stored in the RAM 616 and/or the flash memory 614. The sensor logic module 622 receives requests, from user input or from software or firmware processes, to identify the position of an object 301 generating a gesture in a three-dimensional space.

In one example embodiment, a receiver wave logic module 626 is shown that is software (e.g., integrated with the operating system) or firmware (lower level code that resides is a specific memory for that code and for interfacing with specific hardware, e.g., the processor 620). The receiver wave logic module 626 is configured to receive data relating to a reflected wave and to analyze this data in terms of "X," "Y," and "Z" axes values. Further, this receiver wave logic module 626 may determine whether these axes values exceed a limit value.

In one example embodiment, a gesture logic module 628 is shown that is software (e.g., integrated with the operating system) or firmware (lower level code that resides is a specific memory for that code and for interfacing with specific hardware, e.g., the processor 620). This gesture logic module 628 is executed to determine the gesture associated with the "X," "Y," and "Z" axes values received as data.

The radio subsystem 650 includes a radio processor 660, a radio memory 662, and a transceiver 664. The transceiver 664 may be two separate components for transmitting and receiving signals or a single component for both transmitting and receiving signals. In either instance, it is referenced as a transceiver 664. The receiver portion of the transceiver 664 communicatively couples with a radio signal input of the device 110, e.g., an antenna, where communication signals are received from an established call (e.g., a connected or on-going call). The received communication signals include voice (or other sound signals) received from the call and processed by the radio processor 660 for output through the speaker 120. The transmitter portion of the transceiver 664 communicatively couples a radio signal output of the device 110, e.g., the antenna, where communication signals are transmitted to an established (e.g., a connected (or coupled) or active) call. The communication signals for transmission include voice, e.g., received through the microphone of the device 110, (or other sound signals) that is processed by the radio processor 660 for transmission through the transmitter of the transceiver 664 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), High Speed Download Packet Access (HSDPA), High Speed Uplink Packet Access (HSUPA), and Worldwide Interoperability for Microwave Access (WiMAX).

While other components may be provided with the radio subsystem 650, the basic components shown provide the ability for the mobile computing device to perform radio-frequency communications, including telephonic communications. In an embodiment, many, if not all, of the components under the control of the central processor 620 are not required by the radio subsystem 650 when a telephone call is established, e.g., connected or ongoing. The radio processor 660 may communicate with central processor 620 using the data line (or bus) 678.

The card interface 624 is adapted to communicate, wirelessly or wired, with external accessories (or peripherals), for example, media cards inserted into the expansion slot (not shown). The card interface 624 transmits data and/or instructions between the central processor and an accessory, e.g., an expansion card or media card, coupled within the expansion slot. The card interface 624 also transmits control signals from the central processor 620 to the expansion slot to configure the accessory. It is noted that the card interface 624 is described with respect to an expansion card or media card; it also may be structurally configured to couple with other types of external devices for the device 110, for example, an inductive charging station for the power supply 640 or a printing device.

Figure 7:
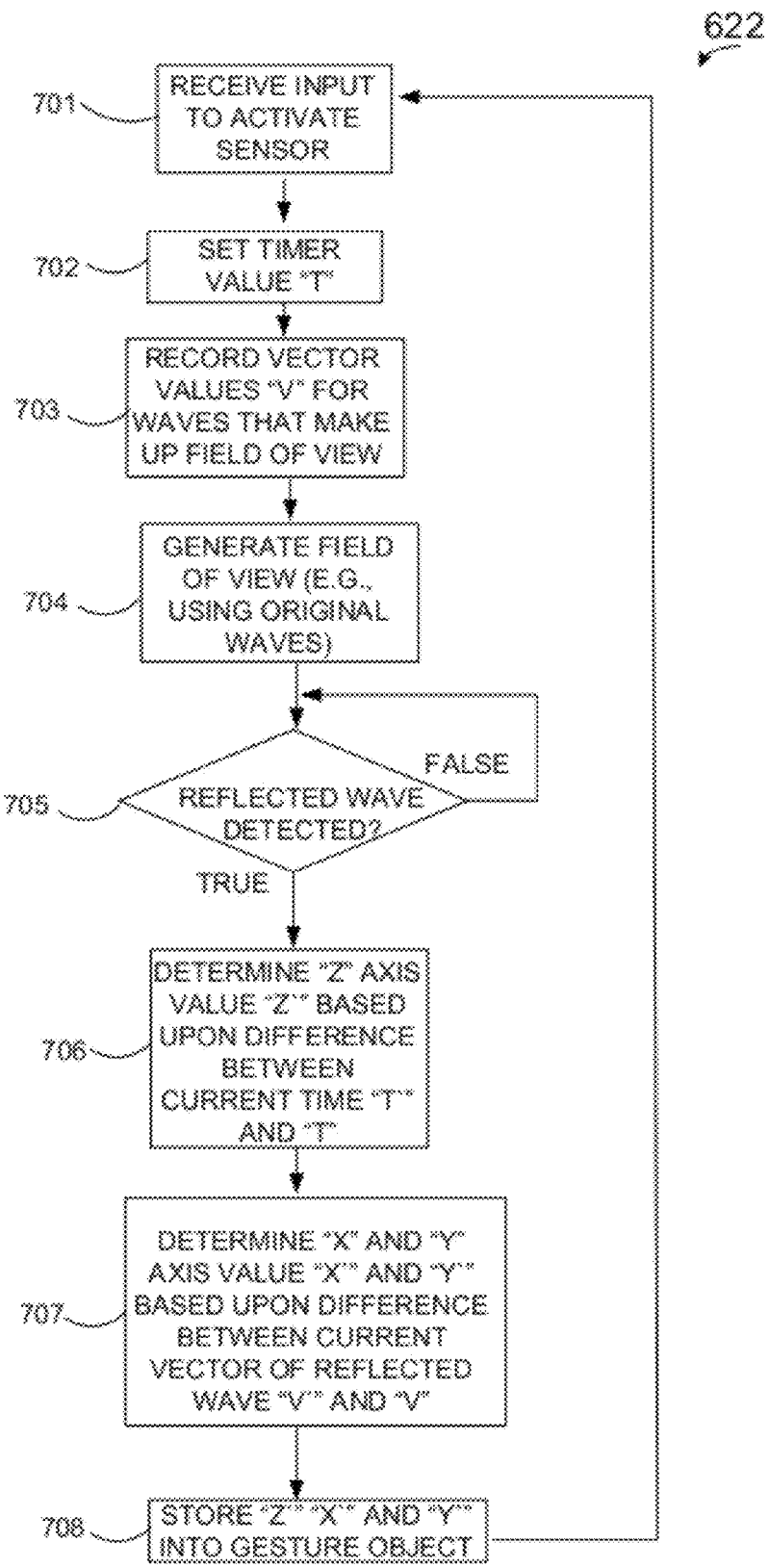
FIG. 7 is a flow chart illustrating a method, according to one example embodiment, associated with executing the sensor logic module.

FIG. 7 is a flow chart illustrating an example method associated with executing the sensor logic module 622. Operation 701 is executed to receive input to activate a sensor. This input may be received via the touch sensitive display 202, physical button, or the performance of a specific gesture within the field of view 203. Operation 702 is executed to set a timer value "T." This timer value "T" may be set to some specific numeric value (e.g., 0). Operation 703 is executed to record vector values "V" for waves that make up the field of view 203. These waves may be one or more of the original waves 401. Operation 704 is executed to generate the field of view 203 using the one or more of the original waves 401. Decision operation 705 is executed to determine whether an original wave 401 has been reflected by an object 301 as it creates a gesture within the field of view 203. In cases where decision operation 705 evaluates to "false," the decision operation 705 is re-executed. In cases where decision operation 75 evaluates to "true," an operation 706 is executed. Operation 706 is executed to determine a "Z'" axis value for the object 301 based upon the difference between "T" and "T'". "T'" is based upon the time at with the reflected wave 402 is received by the sensor 201. For example, if a large "T'" value has been determined, then object 301 may have a large "Z" value. Operation 707 is executed to determine "X" and "Y" values based upon the difference between the current vector value "V'" and the vector value "V." For example, if "V'" is a high value, then the object 301 may be residing in the middle of the field of view 203. Operation 708 is executed to store the "Z'", "X'" and "Y'" values into a gesture object. The gesture object being a data structure. In some example embodiments, a starting position "S" is stored as part of the gesture object. A starting position is an "X," "Y," and/or "Z" value denoting the position at which the object 301 is first detected. In certain instances, this starting position may be used to eliminate certain types of input as redundant as this input may repeat previous "X," "Y," or "Z" values.

Figure 8:
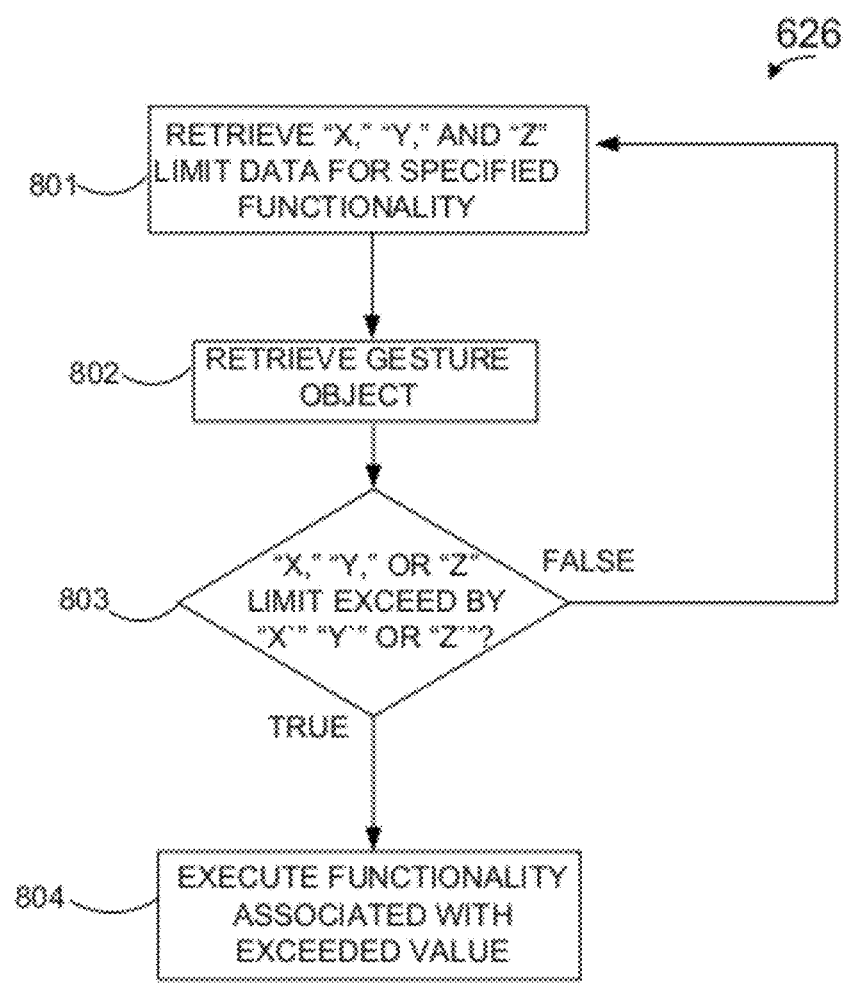
FIG. 8 is a flow chart illustrating a method, according to one example embodiment, associated with executing a receiver wave logic module.

FIG. 8 is a flow chart illustrating an example method associated with executing the receiver wave logic module 626. Operation 801 is executed to retrieve "X", "Y", and "Z" limit data for a specified functionality. These limits may be positive or negative numeric values that, when met or exceeded, results in the execution of functionality (e.g., GUI functionality). Operation 802 is executed to retrieve a gesture object. Decision operation 803 is executed to determine whether the retrieved "X," "Y," or "Z" values (collectively referred to herein as "wave values") have been met or exceeded by the "X'," "Y'," or "Z'" values stored in the gesture object. In cases where decision operation 803 evaluates to "false," the operation 801 is re-executed. In cases where the decision operation 803 evaluates to "true," an operation 804 is executed. Operation 804 is executed to execute the functionality associated with the exceeded value.

FIG. 9 is a flow chart illustrating an example method associated with executing the gesture logic module 628 to facilitate zoom and traversal functionality. FIG. 9 is merely representative of example potential functionality associated with a gesture. Decision operation 901 is executed to determine whether a "Z" limit has been exceeded. In cases where decision operation 901 evaluates to "true," an operation 902 is executed. Operation 902 is executed to facilitate zoom in or out functionality. In cases where decision operation evaluates to "false," a decision operation 903 is executed. Decision operation 903 is executed to determine whether an "X" limit has been exceeded. In cases where decision operation 903 evaluates to "true," an operation 904 is executed. Operation 904 is executed to generate traverse (e.g., scroll left or right) functionality. In cases where decision operation evaluates to "false," a decision operation 905 is executed. Decision operation 905 is executed to determine whether a "Y" limit has been exceeded. In cases where decision operation 905 evaluates to "true," an operation 906 is executed. Operation 906 is executed to generate traverse (e.g., scroll left or right) functionality. In cases where decision operation evaluates to "false," the decision operation 901 is re-executed.

FIG. 10 is a flow chart illustrating an example method associated with executing the gesture logic module 628 to facilitate open/close and axis traversal functionality. FIG. 10 is merely representative of example potential functionality associated with a gesture. Decision operation 1001 is executed to determine whether a "Z" limit has been exceeded. Decision operation 1001 is executed to determine whether a "Z" limit has been exceeded. In cases where decision operation 1001 evaluates to "true," an operation 1002 is executed. Operation 1002 is executed to facilitate open or close functionality (e.g., executing or terminating an application). In cases where decision operation evaluates to "false," a decision operation 1003 is executed. Decision operation 1003 is executed to determine whether an "X" limit has been exceeded. In cases where decision operation 1003 evaluates to "true," an operation 1004 is executed. Operation 1004 is executed move a window along an X-axis. In cases where decision operation evaluates to "false," a decision operation 1005 is executed. Decision operation 1005 is executed to determine whether a "Y" limit has been exceeded. In cases where decision operation 1005 evaluates to "true," an operation 1006 is executed. Operation 1006 is executed to move a window along a Y-axis. In cases where decision operation evaluates to "false," the decision operation 1001 is re-executed.

FIG. 11 is a dual-stream flow chart illustrating an example method 1100 to remotely control a peripheral device, the control of the peripheral device facilitated through the use of gestures and ultrasonic waves. Shown are operations 1101-1104. These operations 1101-1104 are executed by the mobile computing device 110. Also illustrated are operations 1105-1107. These operations are executed by the peripheral 503. Operation 1101 is executed to retrieve the "X," "Y," and "Z" limits data for a specified functionality. Operation 1102 is executed to retrieve the gesture object. Decision operation 1103 is executed to determine whether the "X," "Y," or "Z" limit is exceeded by an "X'," "Z'," or "Y'" value. In cases where decision operation 1103 evaluates to "false," operation 1101 is re-executed. In cases where decision operation 1103 evaluates to "true," operation 1104 is executed to generate command to be transmitted of the communications link 502. Operation 1105 is executed to receive commands. Operation 1106 is executed to interpret the received commands. Operation 1107 may be executed to execute functionality associated with the commands. This functionality may be zoom in/out, traverse or some other suitable functionality.

Figure 12:
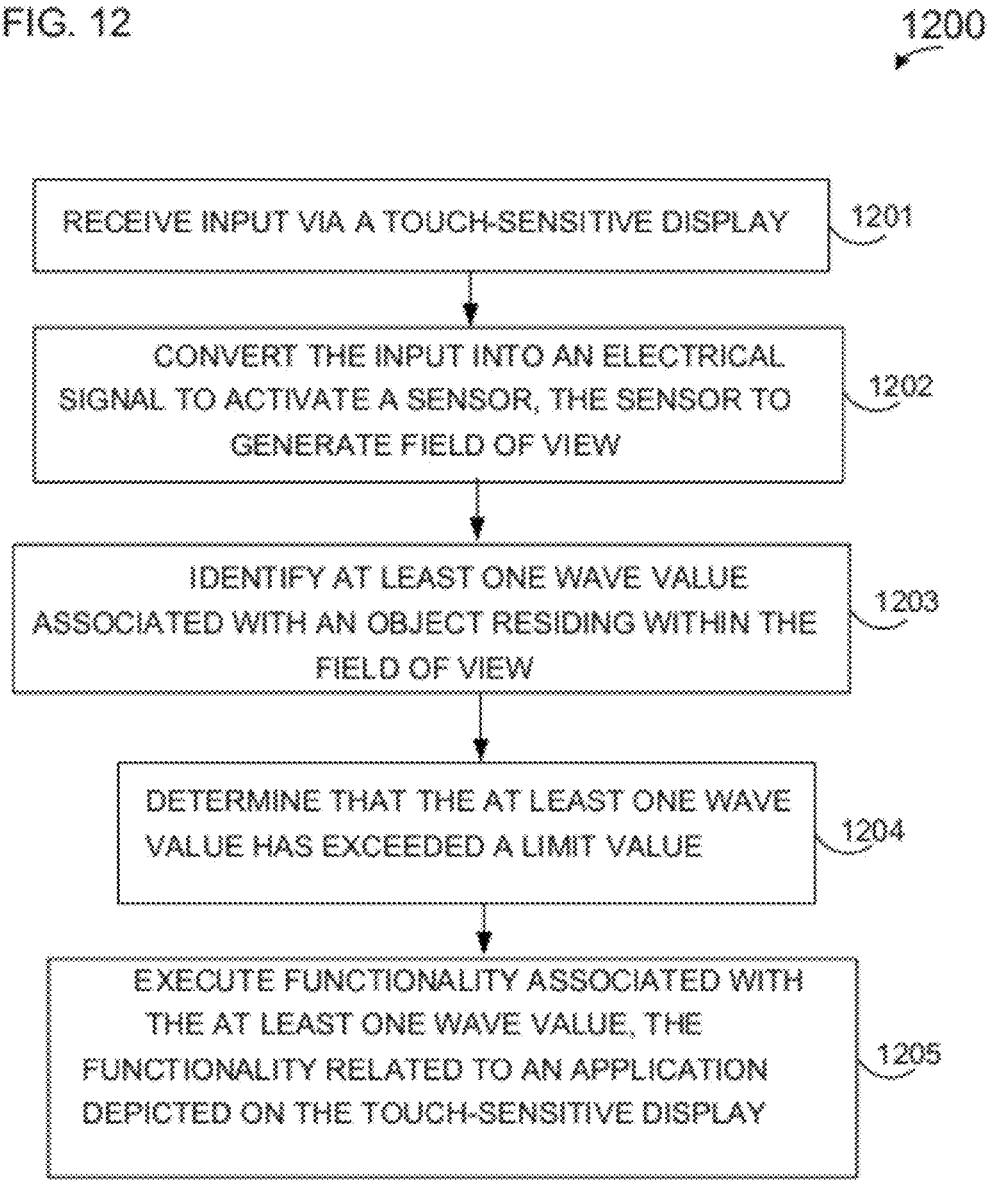
FIG. 12 is a flow chart illustrating a method, according to one example embodiment, executed to detect motion generated from gestures, the gestures used to execute functionality associated with the mobile computing device.

FIG. 12 is a flow chart illustrating a method 1200 executed to detect motion generated from gestures, the gestures used to execute functionality associated with the mobile computing device. This method may be implemented by the mobile computing device 110. Operation 1201 is executed to receiving input via a touch-sensitive display. Operation 1202 is executed to convert the input into an electrical signal to activate a sensor, the sensor to generate field of view. Operation 1203 is executed to identify at least one wave value associated with an object residing within the field of view. Operation 1204 is executed to determine that the at least one wave value has exceeded a limit value. Operation 1205 is executed to execute functionality associated with the at least one wave value, the functionality related to an application depicted on the touch-sensitive display. In some example embodiments, the field of view is conical. In some example embodiments, the at least one wave value is selected from at least one of an X-axis value, a Y-axis value, or a Z-axis value associated with the field of view. In some example embodiments, the limit value is selected from at least one of an X-axis value, a Y-axis value, or a Z-axis value associated with the field of view. In some example embodiments, the receiver wave logic module determines that the at least one wave value has met the limit value.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A computer system comprising:
a touch-sensitive display for receiving input;
a sensor;
a memory resource storing instructions; and
a processor to execute the instructions to perform operations comprising:
activate the sensor, the sensor to provide a field of view;
determine a plurality of wave values associated with an object residing within the field of view provided by the sensor, each of the plurality of wave values corresponding to a different one of a first axis, a second axis, and a third axis in relation to the sensor;

determine that at least one wave value of the plurality of wave values has exceeded a respective limit value for the at least one wave value, the respective limit value corresponding to a direction along the first axis, the second axis, or the third axis; and execute functionality associated with the at least one wave value exceeding the respective limit value, the functionality related to an application providing an interface on the touch-sensitive display.

2. The computer system of claim 1, wherein the computer system is a mobile computing device.

3. The computer system of claim 1, wherein the field of view is conical in shape, wherein a point of the conical shape corresponds to a position of the sensor and the conical shape extends out from the point.

4. The computer system of claim 1, wherein the first axis corresponds to an X-axis, the second axis corresponds to a Y-axis, and the third axis corresponds to a Z-axis.

5. The computer system of claim 4, wherein the functionality associated with a wave value corresponding to the Z-axis is a zoom functionality, and wherein the processor executes the instructions to execute the zoom functionality of the interface when the wave value corresponding to the Z-axis exceeds the respective limit value corresponding to a direction along the Z-axis.

6. The computer system of claim 4, wherein the functionality associated with a wave value corresponding to the X-axis is a move functionality, and wherein the processor executes the instructions to execute the move functionality of the interface when the wave value corresponding to the X-axis exceeds the respective limit value corresponding to a direction along the X-axis.

7. A computer implemented method for operating a mobile computing device, the method being performed by a processor of the mobile computing device and comprising:

activating a sensor, the sensor to provide a field of view;

receiving information detected by the sensor to determine a plurality of wave value associated with an object residing within the field of view, each of the plurality of wave values corresponding to a different one of a first axis, a second axis, and a third axis in relation to the sensor;

determining that at least one wave value of the plurality of wave values has exceeded a respective limit value for the at least one wave value, the respective limit value corresponding to a direction along the first axis, the second axis, or the third axis; and executing functionality associated with the at least one wave value exceeding the respective limit value, the functionality related to an application providing an interface on a touch-sensitive display of the mobile computing device.

8. The computer implemented method of claim 7, wherein the field of view is conical in shape, wherein a point of the conical shape corresponds to a position of the sensor and the conical shape extends out from the point.

9. The computer implemented method of claim 7, wherein the first axis corresponds to an X-axis, the second axis corresponds to a Y-axis, and the third axis corresponds to a Z-axis value.

10. The computer implemented method of claim 9, wherein the functionality associated with a wave value corresponding to the Z-axis is a zoom functionality.

11. The computer implemented method of claim 9, wherein the functionality associated with a wave value corresponding to the X-axis is a move functionality.

12. A non-transitory computer-readable medium storing instructions that, when executed by a processor, cause the processor to perform operations comprising:

activating a sensor of a mobile computing device, the sensor to provide a field of view;

receiving information detected by the sensor to determine a plurality of wave values associated with an object residing within the field of view, each of the plurality of wave values corresponding to a different one of a first axis, a second axis, and a third axis in relation to the sensor;

determining that at least one wave value of the plurality of wave values has exceeded a respective limit value for the at least one wave value, the respective limit value corresponding to a direction along the first axis, the second axis, or the third axis; and executing functionality associated with the at least one wave value exceeding the respective limit value, the functionality related to an application providing an interface on a touch-sensitive display of the mobile computing device.

13. The non-transitory computer-readable medium of claim 12, wherein the field of view is conical in shape, wherein a point of the conical shape corresponds to a position of the sensor and the conical shape extends out from the point.

14. The non-transitory computer-readable medium of claim 12, wherein the first axis corresponds to an X-axis, the second axis corresponds to a Y-axis, and the third axis corresponds to a Z-axis value.

15. The non-transitory computer-readable medium of claim 14, wherein the functionality associated with a wave value corresponding to the Z-axis is a zoom functionality, and wherein the instructions cause the processor to execute the zoom functionality of the interface when the wave value corresponding to the Z-axis exceeds the respective limit value corresponding to a direction along the Z-axis.

16. The non-transitory computer-readable medium of claim 14, wherein the functionality associated with a wave value corresponding to the X-axis is a move functionality, and wherein the instructions cause the processor to execute the move functionality of the interface when the wave value corresponding to the X-axis exceeds the respective limit value corresponding to a direction along the X-axis.

* * * * *